(12) United States Patent
Fan

(10) Patent No.: US 12,323,898 B2
(45) Date of Patent: Jun. 3, 2025

(54) METHOD FOR RELAY COMMUNICATION FOR USER EQUIPMENT AND USER EQUIPMENT

(71) Applicant: BEIJING UNISOC COMMUNICATIONS TECHNOLOGY CO., LTD., Beijing (CN)

(72) Inventor: Huifang Fan, Beijing (CN)

(73) Assignee: BEIJING UNISOC COMMUNICATIONS TECHNOLOGY CO., LTD., Beijing (CN)

( * ) Notice: Subject to any disclaimer, the term of this patent is extended or adjusted under 35 U.S.C. 154(b) by 349 days.

(21) Appl. No.: 17/799,999

(22) PCT Filed: Feb. 10, 2021

(86) PCT No.: PCT/CN2021/076540
§ 371 (c)(1),
(2) Date: Aug. 16, 2022

(87) PCT Pub. No.: WO2021/164687
PCT Pub. Date: Aug. 26, 2021

(65) Prior Publication Data
US 2023/0079604 A1    Mar. 16, 2023

(30) Foreign Application Priority Data
Feb. 17, 2020   (CN) .......................... 202010098023.6

(51) Int. Cl.
*H04W 8/00*       (2009.01)
*H04W 40/22*      (2009.01)
*H04W 88/04*      (2009.01)

(52) U.S. Cl.
CPC ............ *H04W 40/22* (2013.01); *H04W 88/04* (2013.01)

(58) Field of Classification Search
None
See application file for complete search history.

(56) References Cited

U.S. PATENT DOCUMENTS

2015/0382142 A1   12/2015   Kim et al.
2016/0156404 A1   6/2016    Wolfner et al.
(Continued)

FOREIGN PATENT DOCUMENTS

CN    101188816 A    5/2008
CN    103781017 A    5/2014
(Continued)

OTHER PUBLICATIONS

The first office action issued in corresponding CN application No. 202010098023.6 dated Dec. 3, 2021.
(Continued)

*Primary Examiner* — Gary Lafontant
(74) *Attorney, Agent, or Firm* — HAUPTMAN HAM, LLP

(57) ABSTRACT

A method for relay communication for a user equipment (UE) is provided. The method includes the following. A UE 1 transmits a data packet to other UEs, where the data packet includes relay information, where according to the relay information, the other UEs are able to serve as a relay UE of the UE 1, or the other UEs are unable to serve as the relay UE of the UE 1.

12 Claims, 6 Drawing Sheets

(56) References Cited

U.S. PATENT DOCUMENTS

2019/0357280 A1    11/2019  Lee et al.
2021/0021536 A1*    1/2021  Ganesan ............... H04L 1/1896
2021/0297842 A1*    9/2021  Shrivastava .......... H04W 28/24

FOREIGN PATENT DOCUMENTS

| CN | 104938023 A | 9/2015 |
| CN | 105992298 A | 10/2016 |
| CN | 106162929 A | 11/2016 |
| CN | 106162930 A | 11/2016 |
| CN | 106454993 A | 2/2017 |
| CN | 109479189 A | 3/2019 |
| CN | 110089086 A | 8/2019 |
| EP | 2413517 A1 | 2/2012 |

OTHER PUBLICATIONS

The second office action issued in corresponding CN application No. 202010098023.6 dated Jul. 1, 2022.
WIPO, International Search Report and Written Opinion for International Application No. PCT/CN2021/076540, Apr. 30, 2021.

* cited by examiner

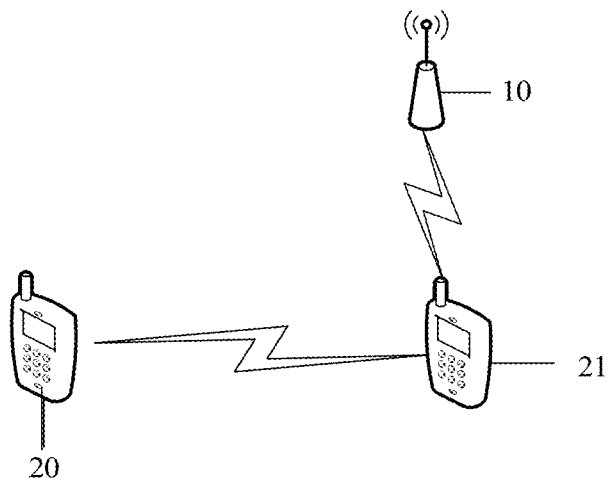

FIG. 1

```
┌─────────────────────────────────────────────────────────────┐
│ TRANSMIT, BY A UE 1, A DATA PACKET TO OTHER UES, WHERE      │ S200
│ THE DATA PACKET INCLUDES RELAY INFORMATION                  │
└─────────────────────────────────────────────────────────────┘
                              │
                              ▼
┌─────────────────────────────────────────────────────────────┐
│ DETERMINE, BY THE OTHER UES, WHETHER TO SERVE AS A          │ S201
│ RELAY UE OF THE UE 1 ACCORDING TO THE RELAY                 │
│ INFORMATION                                                 │
└─────────────────────────────────────────────────────────────┘
```

FIG. 2

METHOD FOR RELAY COMMUNICATION FOR USER EQUIPMENT AND USER EQUIPMENT

CROSS-REFERENCE TO RELATED APPLICATION(S)

This application is a National Stage of International Application No. PCT/CN2021/076540, filed on Feb. 10, 2021, which claims priority to Chinese Patent Application No. 202010098023.6, filed on Feb. 17, 2020, the entire disclosure of which are incorporated herein by reference.

TECHNICAL FIELD

This disclosure relates to the field of communication technology, and in particular, to methods for relay communication for a user equipment (UE) and a UE.

BACKGROUND

In long term evolution (LTE), proximity-based services (ProSe) direct communication is introduced. Direct communication can be performed between user equipment (UE) A and UE B (may also be multiple UEs) via a PC5 interface. PC5 interface is a direct interface between UEs. When service and system aspects (SA) work group (WG2) in a 3rd generation partnership project (3GPP) studies a system architecture of ProSe direct communication, a UE-to-UE relay communication architecture is introduced, where the architecture enables that UE A and UE B, which cannot communicate directly through a PC5 link, can relay service data through other UEs (relay UEs), thereby realizing direct communication. When a distance between UE A and UE B is too large, or too much occlusion is between UE A and UE B, multiple relay UEs may be needed to relay data for UE A and UE B, and this communication mode is called multi-hop UE-to-UE relay communication.

However, in existing multi-hop UE-to-UE relay communication, there may exist problems of a great number of relay times and many relay devices, thereby affecting relay efficiency of a UE.

SUMMARY

Methods for relay communication for a user equipment (UE) and a UE are provided in embodiments of the disclosure.

A method for relay communication for a UE is provided in a first aspect of embodiments of the disclosure. The method includes the following. A UE 1 transmits a data packet to other UEs, where the data packet includes relay information, and according to the relay information, the other UEs are able to serve as a relay UE of the UE 1, or the other UEs are unable to serve as the relay UE of the UE 1.

A method for relay communication for a UE is provided in a second aspect of embodiments of the disclosure. The method includes the following. A UE 2 receives a data packet transmitted by a UE 1, where the data packet includes relay information, and according to the relay information, other UEs are able to serve as a relay UE of the UE 1, or the other UEs are unable to serve as the relay UE of the UE 1. The UE 2 parses the data packet to acquire the relay information, and determines to serve as a relay of the UE 1 according to the relay information, or determines not to serve as the relay of the UE 1 according to the relay information.

A UE 1 is provided in a third aspect of embodiments of the disclosure. The UE 1 includes a communication interface, a processor, and a memory storing a computer program which, when executed by the processor, causes the communication interface to transmit a data packet to other UEs, where the data packet includes relay information, and according to the relay information, the other UEs are able to serve as a relay UE of the UE 1, or the other UEs are unable to serve as the relay UE of the UE 1.

BRIEF DESCRIPTION OF THE DRAWINGS

The following will illustrate drawings used in embodiments of the disclosure.

FIG. 1 is a schematic structural diagram illustrating a communication system provided in embodiments of the disclosure.

FIG. 2 illustrates a method for relay communication for a user equipment (UE) provided in embodiments of the disclosure.

DETAILED DESCRIPTION

Figure 3:
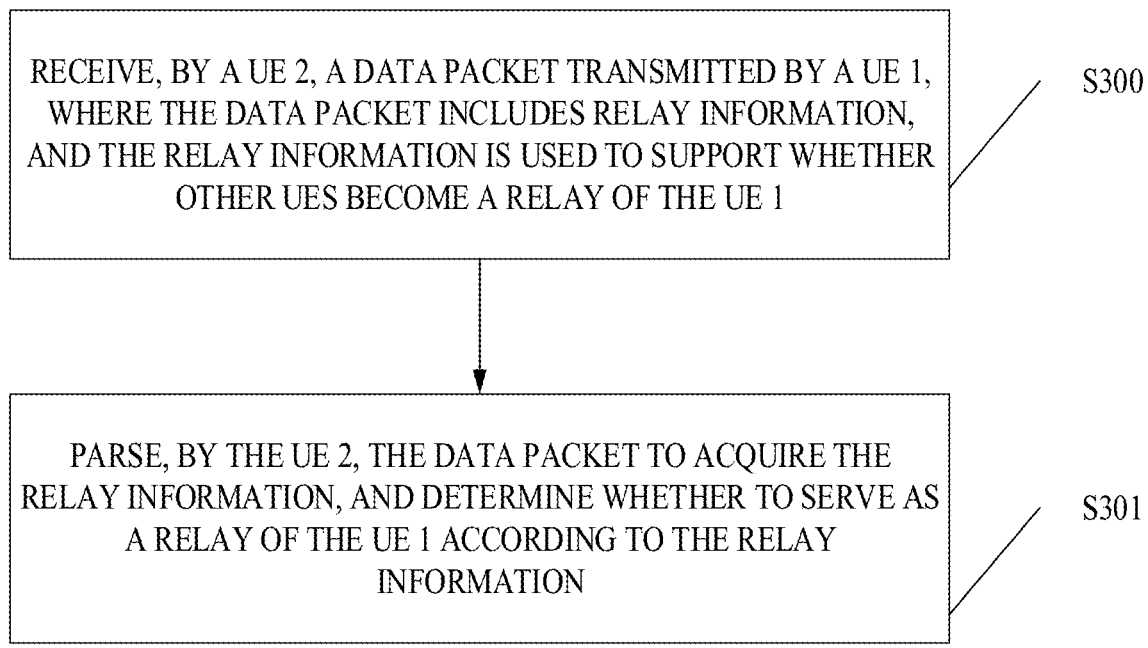
FIG. 3 illustrates a method for relay communication for a UE provided in embodiments of the disclosure.

The following will illustrate embodiments of the disclosure with reference to the accompanying drawings of embodiments of the disclosure.

The term "and/or" in this disclosure is simply an illustration of an association relationship of associated objects, indicating that three relationships can exist, for example, A and/or B, which can indicate the existence of A alone, A and B together, and B alone. In addition, the character "I" in this disclosure generally indicates that associated objects are in an "or" relationship.

"Multiple" or "a plurality of" appearing in embodiments of the disclosure refers to "at least two". The "first", "second", and the like appearing in embodiments of the disclosure are only used to illustrate and distinguish objects of illustration, without any order, also do not mean any special limitation on the number of devices in embodiments of the disclosure, and do not constitute any limitation on embodiments of the disclosure. The "connecting" or "coupling" appearing in embodiments of the disclosure refers to various connection modes such as direct connection or indirect connection to realize communication between devices, which is not limited in embodiments of the disclosure.

In a multi-hop user equipment (UE)-to-UE relay architecture, how to select a specific relay hop count is a problem to-be-solved. Currently, a most common solution is that a base station pre-configures for a UE a maximum relay hop count required for relay. In this case, the UE may set a relay counter in a medium access control (MAC) header and/or sidelink control information (SCI) of a data packet of the UE, where an initial value of the counter is set to be the maximum relay hop count configured/pre-configured by the base station. After each relay, a value of the counter is decreased by 1 until it is decreased to 0, at this point, other UEs do not relay a data packet of the UE. However, since the base station is unable to know an accurate relay hop count required by the UE, it may cause that the maximum relay hop count configured by the base station is too large, thereby resulting in waste of resources, or it may cause that the maximum relay hop count configured by the base station is too small, so that a communication distance requirement of the UE cannot be satisfied.

Referring to FIG. 1, FIG. 1 is a schematic structural diagram illustrating a communication system provided in embodiments of the disclosure. The communication system includes a base station 10, a UE 20, and a UE 21, where the base station connects with UEs through wireless communication. The wireless communication includes but is not limited to long term evolution (LTE) connection and new radio (NR) connection, and may also be other connection manners in actual applications, where specific manners for the above connection will not be limited herein. The base station above may be an LTE base station, and may also be an NR base station or an access point (AP). The UE 20 can perform relay communication with the UE 21, where the UE 20 may be a relay UE, and the UE 21 may also be a relay UE. In actual application, the number of UEs in the communication system as illustrated in FIG. 1 may also be increased, and a specific number can be determined according to actual relay scenarios, where the number of UEs in the communication system as illustrated in FIG. 1 will not be limited in specific embodiments of the disclosure.

The terminal in embodiments of the disclosure may refer to a UE, an access terminal, a subscriber unit, a subscriber station, a mobile station (MS), a mobile platform, a remote station, a remote terminal, a mobile device, a user terminal, a terminal equipment, a wireless communication device, a user agent, or a user apparatus in various forms. The terminal equipment may also be a cellular radio telephone, a cordless telephone, a session initiation protocol (SIP) telephone, a wireless local loop (WLL) station, or a personal digital assistant (PDA). The terminal equipment may also be a device with wireless communication functions such as a handheld device, a computing device, other processing devices coupled with a wireless modem, an in-vehicle device, a wearable device, a terminal equipment in the future 5th generation (5G) network, a terminal equipment in a future evolved public land mobile network (PLMN), or the like, which will not be limited embodiments of the disclosure.

Referring to FIG. 2, FIG. 2 provides a method for relay communication for a UE. The method is performed in the communication system as illustrated in FIG. 1, and as illustrated in FIG. 2, the method includes the following.

At S200, the UE 1 transmits a data packet to other UEs, where the data packet includes relay information.

Specifically, the UE 1 can transmit the data packet to the other UEs through broadcast or multicast. Transmission through broadcast or multicast can include transmission through a mobile communication network such as an LTE network or an NR network. In actual applications, transmission through broadcast or multicast can also include transmission through a short-distance network such as bluetooth, wireless fidelity (WiFi®), radio frequency, or the like. Specific expressive forms of a bearer network for the above broadcast or multicast will not be limited in the disclosure.

Specifically, in an optional solution, the relay information can be used to support whether the other UEs serve as a relay UE of the UE 1.

Specifically, in another optional solution in a relay scenario, the relay information includes but is not limited to one of or any combination of: a source zone identifier (ID), a zone ID of the UE 1 of a previous hop, a distance parameter X, or a range, where the range is a maximum communication distance or a minimum communication distance required by services.

In another optional solution, the relay information may further include information of relay hop count, and the information of relay hop count may be a relay counter. Each time the data packet is relayed, a value of the relay counter is decreased by 1. An initial value of the relay counter can be configured by a network device (e.g., a base station or an AP), and can also be configured through control signaling, e.g., radio resource control (RRC) signaling. The initial value of the relay counter can also be configured through other control signaling, where specific configuration manners and specific expressive forms of the above control signaling will not be limited in the disclosure.

In an optional solution in the disclosure, the relay information may be carried in an MAC header or SCI of the data packet. In another optional solution, the relay information may be carried in the MAC header and the SCI. In actual application, the relay information may also be carried in other positions in the data packet, e.g., customizing a field to coordinate the relay information.

At S201, the other UEs determine whether to serve as a relay UE of the UE 1 according to the relay information.

Specifically, the other UEs determine whether the other UEs satisfy a relay condition of the UE 1 according to information of the other UEs and the relay information, and if any one UE in the other UEs satisfies the relay condition of the UE 1, the UE determines to serve as the relay UE of the UE 1.

According to the method illustrated in FIG. 2, the UE 1 adds the relay information into the data packet transmitted, such that the other UEs, after receiving the data packet, can determine whether the other UEs satisfy the relay condition of the UE 1 according to the relay information, thereby avoiding problems of a great number of relay times and many relay devices, and thus increasing relay efficiency of the UE 1.

Referring to FIG. 3, FIG. 3 illustrates a method for relay communication for a UE provided in embodiments of the disclosure. The method is performed in the system as illustrated in FIG. 1, and the method includes but is not limited to the following.

At S300, the UE 2 receives a data packet transmitted by the UE 1, where the data packet includes relay information, and the relay information is used to support whether other UEs serve as a relay of the UE 1.

Specifically, in another optional solution in a relay scenario, the relay information includes but is not limited to one of or any combination of: a source zone ID, a zone ID of the UE 1 of a previous hop, a distance parameter X, or a range, where the range is a maximum communication distance or a minimum communication distance required by services.

In another optional solution, the relay information may further include information of relay hop count, and the information of relay hop count may be a relay counter. Each time the data packet is relayed, a value of the relay counter is decreased by 1. An initial value of the relay counter can be configured by a network device (e.g., a base station or an AP), and can also be configured through control signaling, e.g., RRC signaling. The initial value of the relay counter can also be configured through other control signaling, where specific configuration manners and specific expressive forms of the above control signaling will not be limited in the disclosure.

At S301, the UE 2 parses the data packet to acquire the relay information, and determines whether to serve as a relay of the UE 1 according to the relay information.

Specifically, in an optional solution, the UE 2 acquires a distance Z between the UE 2 and a source UE according to the source zone ID, and acquires a distance Y between the UE of the previous hop and the UE 2 according to the zone ID of the UE of the previous hop. If Z<range and Y>X, the UE 2 determines to serve as the relay of the UE 1.

According to the technical solution, in actual applications, since Y is limited to be larger than X, a problem that the UE 2 is closer to UE 0 (the UE of the previous hop) is avoided, thereby avoiding increasing the relay hop count.

Specifically, in another optional solution, acquire a distance Z between the UE 2 and a source UE according to the source zone ID, and acquire a distance Y between the UE of the previous hop and the UE 2 according to the zone ID of the UE of the previous hop. If Z<range, Y>X, and relay counter≥0, the UE 2 determines to serve as the relay of the UE 1.

According to the technical solution, in actual applications, since Y is limited to be larger than X, a problem that the UE 2 is closer to the UE 0 (the UE of the previous hop) is avoided, thereby avoiding increment of the relay hop count and ensuring that a total number of relays is smaller than the relay hop count.

Optionally, the method further includes the following after S301. After the UE 2 determines to serve as the relay of the UE 1, the UE 2 forwards the data packet.

According to the method illustrated in FIG. 3, the UE 2 acquires the relay information in the data packet received, such that the UE 2 can determine whether the UE 2 satisfies a relay condition of the UE 1 according to the relay information. If the UE 2 satisfies the relay condition of the UE 1, the UE 2 serves as the relay UE of the UE 1 and then forwards the data packet of the UE 1. Since the UE 2 performs conditional determination before the UE 2 forwards the data packet of the UE 1, the number of relay devices and the number of relay times are decreased, and thus increasing relay efficiency.

Figure 4:
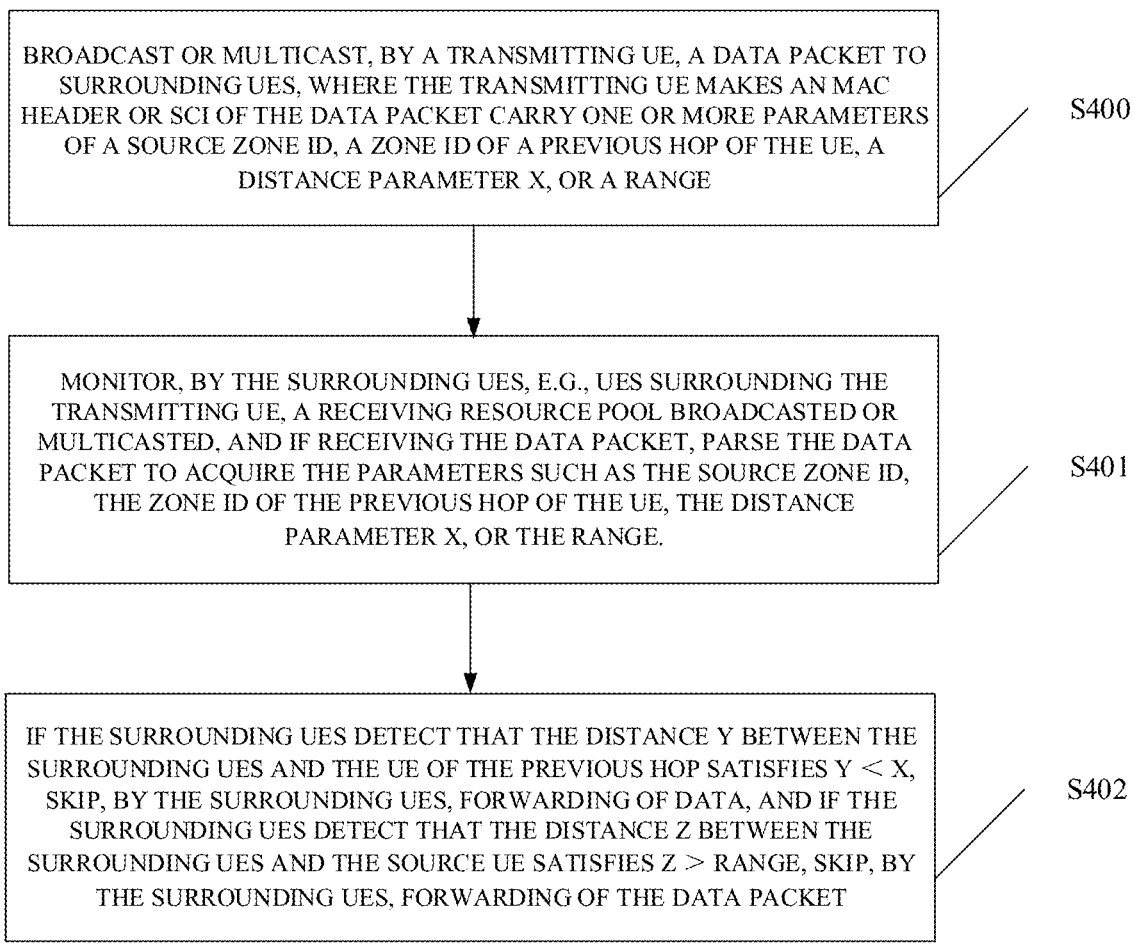
FIG. 4 illustrates a method for relay communication for a UE provided in embodiments of the disclosure.
Figure 4A:
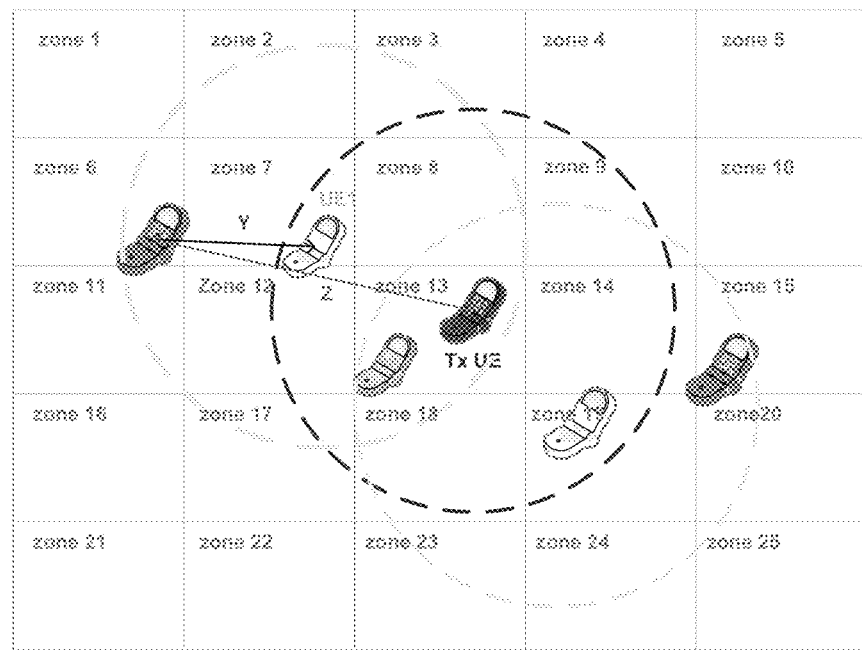
FIG. 4a is a schematic diagram illustrating networking provided in embodiments of the disclosure.

Referring to FIG. 4, FIG. 4 provides a method for relay communication for a UE. The method is performed in the system as illustrated in FIG. 1. The method for relay communication as illustrated in FIG. 4 may be performed in a multicast scenario with no leader. A schematic diagram illustrating a networking scenario is illustrated in FIG. 4a, and the method as illustrated in FIG. 4 includes the following.

At S400, a transmitting UE broadcasts or multicasts a data packet to surrounding UEs, where the transmitting UE makes an MAC header or SCI of the data packet carry one or more parameters of a source zone ID (a zone ID where the transmitting UE is located), a zone ID of the UE of a previous hop (a zone ID where the UE of the previous hop is located), a distance parameter X, or a range.

At S401, the surrounding UEs, e.g., UEs surrounding the transmitting UE, monitor a receiving resource pool broadcasted or multicasted, and if receiving the data packet, parse the data packet to acquire the parameters such as the source zone ID (the zone ID where the transmitting UE is located), the zone ID of the UE of the previous hop (the zone ID where the UE of the previous hop is located), the distance parameter X, or the range. A UE in the surrounding UEs, e.g., a UE 2, determines a distance Z between the UE 2 and a source transmitting UE and a distance Y between the UE 2 and the UE of the previous hop (i.e., UE 1) according to the source zone ID and the zone ID of the UE of the previous hop (the same as the source zone ID). If Y>X and Z<range, the UE 2 serves as a relay UE and then forwards the data packet received.

At S402, the surrounding UEs repeat S401. If the surrounding UEs detect that the distance Y between the surrounding UEs and the UE of the previous hop satisfies Y<X, the surrounding UEs do not forward data. If the surrounding UEs detect that the distance Z between the surrounding UEs and the source transmitting UE satisfies Z>range, the surrounding UEs also do not forward the data packet.

According to the method illustrated in FIG. 4, the UE 2 acquires the relay information in the data packet received, such that the UE 2 can determine whether the UE 2 satisfies a relay condition of the UE 1 according to the relay information. If the UE 2 satisfies the relay condition of the UE 1, the UE 2 serves as the relay UE of the UE 1 and then forwards the data packet of the UE 1. Since the UE 2 performs conditional determination before the UE 2 forwards the data packet of the UE 1, the number of relay devices and the number of relay times are decreased, and thus increasing relay efficiency.

Figure 5:
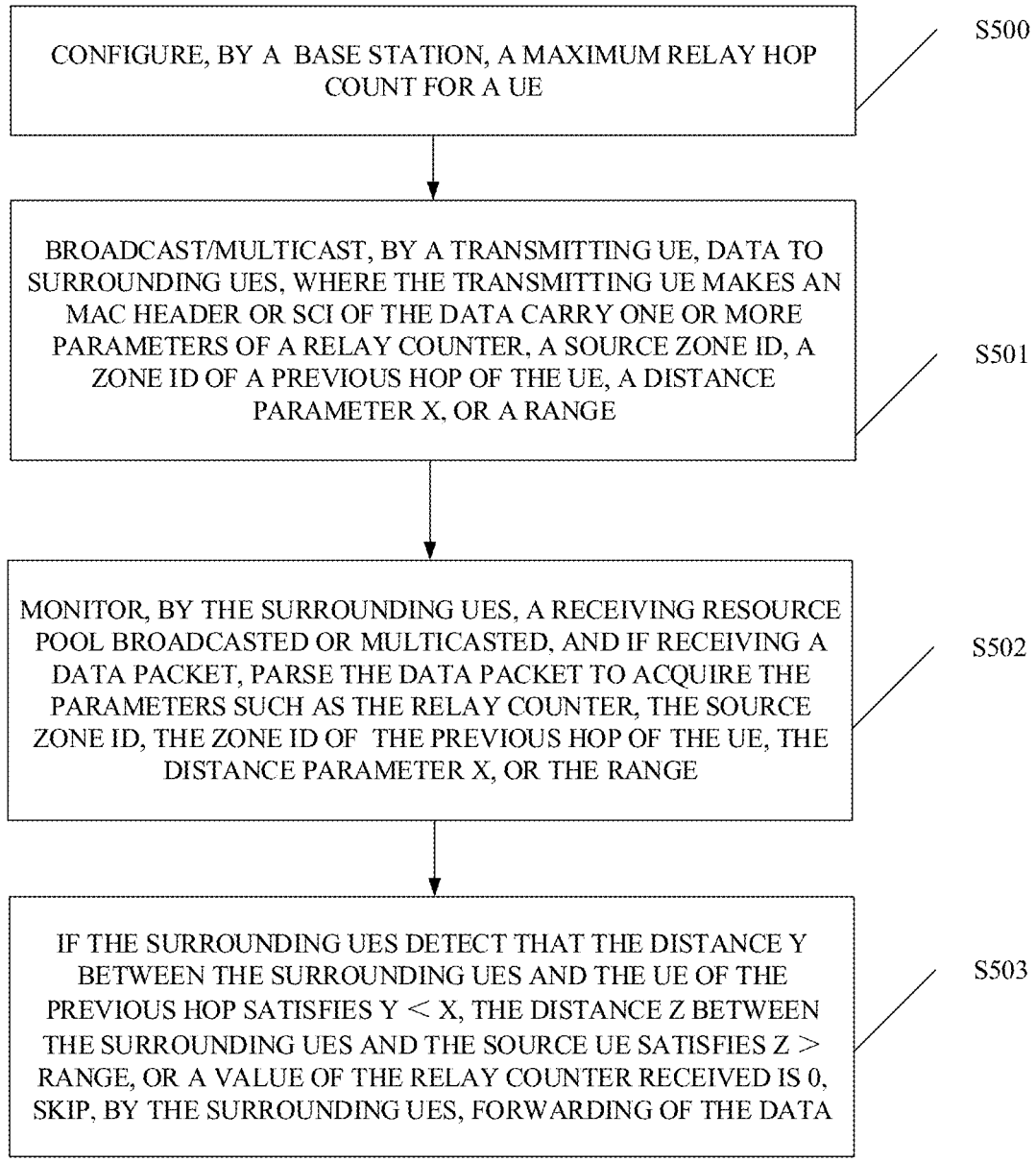
FIG. 5 illustrates a method for relay communication for a UE provided in embodiments of the disclosure.

Referring to FIG. 5, FIG. 5 provides a method for relay communication for a UE. The method is performed in the system as illustrated in FIG. 1. The method for relay communication as illustrated in FIG. 5 may be performed in a multicast scenario with a leader. A schematic diagram illustrating a networking scenario is illustrated in FIG. 4a, and the method as illustrated in FIG. 5 includes the following.

At S500, the base station configures a maximum relay hop count for the UE.

At S501, a transmitting UE broadcasts/multicasts data to surrounding UEs, where the transmitting UE makes an MAC header or SCI of the data carry one or more parameters of a relay counter, a source zone ID (a zone ID where the transmitting UE is located), a zone ID of the UE of a previous hop (a zone ID where the UE of the previous hop is located), a distance parameter X, or a range.

At S502, the surrounding UEs (e.g., a UE 2) monitor a receiving resource pool broadcasted or multicasted, and if receiving a data packet, parse the data packet to acquire the parameters such as the relay counter, the source zone ID (the zone ID where the transmitting UE is located), the zone ID of the UE of the previous hop (the zone ID where the UE of the previous hop is located), the distance parameter X, or the range. A UE determines whether to serve as a relay UE according to possible configurations in the data packet received.

Specifically, implementation manners of S502 specifically include the following.

In an optional solution, if the MAC header and/or SCI of the data packet received carries the parameters such as the relay counter, the source zone ID, the zone ID of the UE of the previous hop, the distance parameter X, or the range, determine a distance Z between the UE 2 and a source transmitting UE and a distance Y between the UE 2 and the UE of the previous hop according to the source zone ID and the zone ID of the UE of the previous hop (the same as the source zone ID). If Y>X and Z<range, the UE 2 serves as a relay UE and then forwards the data packet received.

In another optional solution, if the MAC header and/or SCI of the data packet received carries the parameters such as the relay counter, the zone ID of the UE of the previous hop, or the distance parameter X, determine the distance Y between the UE 2 and the UE of the previous hop according to the zone ID of the UE of the previous hop (the same as the source zone ID). If Y>X and a value of the relay counter is 0, the UE 2 serves as a relay UE and then forwards the data packet received.

At S503, the surrounding UEs repeat S502. Accordingly, if the surrounding UEs detect that the distance Y between the surrounding UEs and the UE of the previous hop satisfies Y<X, the distance Z between the surrounding UEs and the source transmitting UE satisfies Z>range, or a value of the relay counter received is 0, the surrounding UEs do not forward the data.

According to the method illustrated in FIG. 5, the surrounding UEs acquire the relay information in the data packet received, such that the surrounding UEs can determine whether the surrounding UEs satisfy a relay condition of the UE 1 according to the relay information. If a UE (e.g., a UE 2) of the surrounding UEs satisfies the relay condition of the UE 1, the UE 2 serves as the relay UE of the UE 1 and then forwards the data packet of the UE 1. Since the UE 2 performs conditional determination before the UE 2 forwards the data packet of the UE 1, a forwarding condition and the maximum relay hop count configured by the base station are satisfied, thereby decreasing the number of relay devices and the number of relay times and satisfying the configuration of the maximum relay hop count configured by the base station, and thus increasing relay efficiency.

Figure 6:
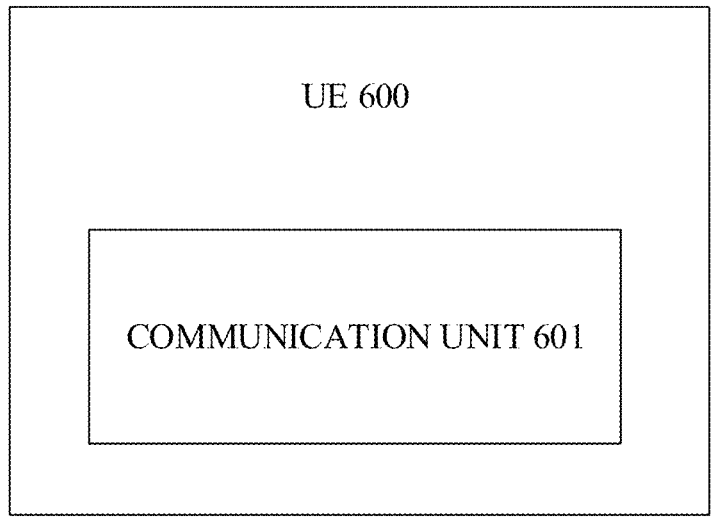
FIG. 6 is a schematic structural diagram illustrating a UE provided in embodiments of the disclosure.

Referring to FIG. 6, FIG. 6 provides a UE 600. The UE may be any one UE in the communication system as illustrated in FIG. 1, e.g., a transmitting UE (i.e., a UE 1) for transmitting a data packet, and the UE 1 specifically includes a communication unit 601. The communication unit 601 is configured to transmit a data packet to other UEs, where the data packet includes relay information.

Specifically, the communication unit 601 can transmit the data packet to the other UEs through broadcast or multicast. Transmission through broadcast or multicast can include transmission through a mobile communication network such as an LTE network or an NR network. In actual applications, transmission through broadcast or multicast can also include transmission through a short-distance network such as bluetooth, WiFi, radio frequency, or the like. Specific expressive forms of a bearer network for the above broadcast or multicast will not be limited in the disclosure.

Specifically, in an optional solution, the relay information can be used to support whether the other UEs serve as a relay UE of the UE 1.

Specifically, in another optional solution in a relay scenario, the relay information includes but is not limited to one of or any combination of: a source zone ID, a zone ID of the UE 1 of a previous hop, a distance parameter X, or a range, where the range is a maximum communication distance or a minimum communication distance required by services.

In another optional solution, the relay information may further include information of relay hop count, and the information of relay hop count may be a relay counter. Each time the data packet is relayed, a value of the relay counter is decreased by 1. An initial value of the relay counter can be configured by a network device (e.g., a base station or an AP), and can also be configured through control signaling, e.g., RRC signaling. The initial value of the relay counter can also be configured through other control signaling, where specific configuration manners and specific expressive forms of the above control signaling will not be limited in the disclosure.

In an optional solution in the disclosure, the relay information may be carried in an MAC header or SCI of the data packet. In another optional solution, the relay information may be carried in the MAC header and the SCI. In actual application, the relay information may also be carried in other positions in the data packet, e.g., customizing a field to coordinate the relay information.

It is to be noted that for implementations of each unit, reference can also made to corresponding illustration of the method embodiments as illustrated in FIG. 2, FIG. 4, and FIG. 5.

In the UE illustrated in FIG. 6, the communication unit of the UE 1 adds the relay information into the data packet transmitted, such that the other UEs, after receiving the data packet, can determine whether the other UEs satisfy a relay condition of the UE 1 according to the relay information, thereby avoiding problems of a great number of relay times and many relay devices, and thus increasing relay efficiency of the UE 1

Figure 7:
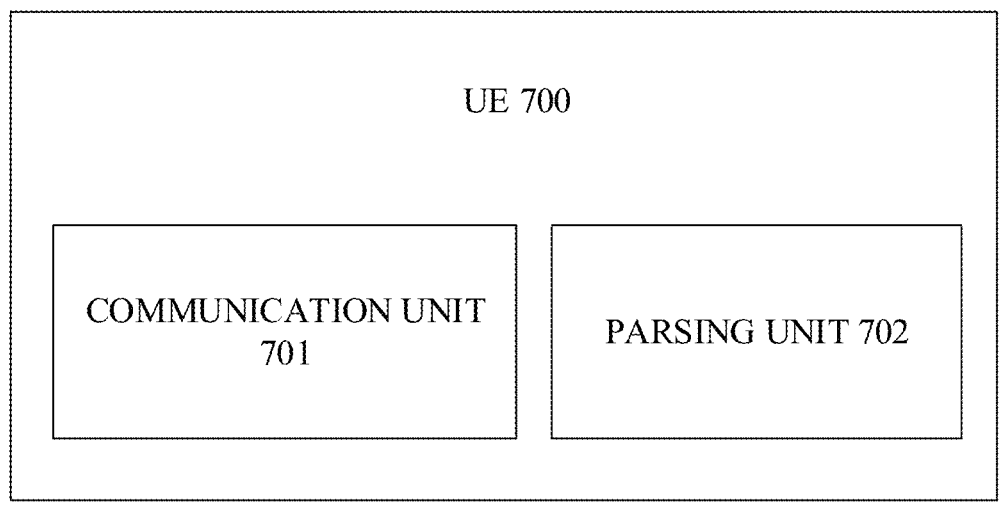
FIG. 7 is a schematic structural diagram illustrating a UE provided in embodiments of the disclosure.

Referring to FIG. 7, FIG. 7 illustrates a UE 700 provided in embodiments of the disclosure. The UE may be any one UE in the communication system as illustrated in FIG. 1, e.g., a surrounding UE (i.e., a UE 2) of a transmitting UE for transmitting a data packet, and the UE 2 specifically includes a communication unit 701 and a parsing unit 702.

The communication unit 701 is configured to receive a data packet transmitted by the UE 1, where the data packet includes relay information, and the relay information is used to support whether other UEs serve as a relay of the UE 1.

Specifically, in another optional solution in a relay scenario, the relay information includes but is not limited to one of or any combination of: a source zone ID, a zone ID of the UE 1 of a previous hop, a distance parameter X, or a range, where the range is a maximum communication distance or a minimum communication distance required by services.

In another optional solution, the relay information may further include information of relay hop count, and the information of relay hop count may be a relay counter. Each time the data packet is relayed, a value of the relay counter is decreased by 1. An initial value of the relay counter can be configured by a network device (e.g., a base station or an AP), and can also be configured through control signaling, e.g., RRC signaling. The initial value of the relay counter can also be configured through other control signaling, where specific configuration manners and specific expressive forms of the above control signaling will not be limited in the disclosure.

The parsing unit 702 is configured to parse the data packet to acquire the relay information, and determine whether to serve as a relay of the UE 1 according to the relay information.

Specifically, in an optional solution, the parsing unit 702 acquires a distance Z between the UE 2 and a source UE according to the source zone ID, and acquires a distance Y between the UE of the previous hop and the UE 2 according to the zone ID of the UE of the previous hop. If Z<range and Y>X, the UE 2 determines to serve as the relay of the UE 1.

According to the technical solution, in actual applications, since Y is limited to be larger than X, a problem that the UE 2 is closer to UE 0 (the UE of the previous hop) is avoided, thereby avoiding increasing the relay hop count.

Specifically, in another optional solution, the parsing unit 702 acquires a distance Z between the UE 2 and a source UE according to the source zone ID, and acquires a distance Y between the UE of the previous hop and the UE 2 according to the zone ID of the UE of the previous hop. If Z<range, Y>X, and relay counter≥0, the UE 2 determines to serve as the relay of the UE 1.

According to the technical solution, in actual applications, since Y is limited to be larger than X, a problem that the UE 2 is closer to the UE 0 (the UE of the previous hop) is avoided, thereby avoiding increment of the relay hop count and ensuring that a total number of relays is smaller than the relay hop count.

Optionally, after the UE 2 determines to serve as the relay of the UE 1, the communication unit forwards the data packet.

In the UE illustrated in FIG. 7, the UE 2 acquires the relay information in the data packet received, such that the UE 2 can determine whether the UE 2 satisfies a relay condition of the UE 1 according to the relay information. If the UE 2 satisfies the relay condition of the UE 1, the UE 2 serves as the relay UE of the UE 1 and then forwards the data packet of the UE 1. Since the UE 2 performs conditional determination before the UE 2 forwards the data packet of the UE 1, the number of relay devices and the number of relay times are decreased, and thus increasing relay efficiency.

It is to be noted that for implementations of each unit, reference can also made to corresponding illustration of the method embodiments as illustrated in FIG. 3, FIG. 4, and FIG. 5.

Figure 8:
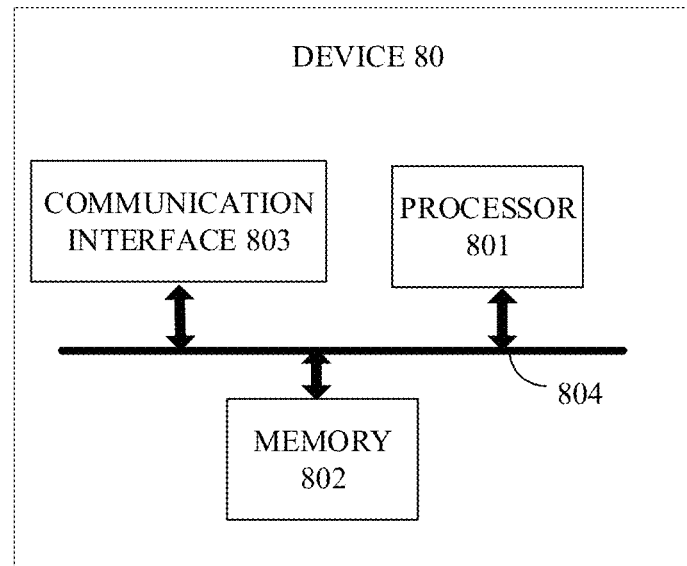
FIG. 8 is a schematic structural diagram illustrating a device provided in embodiments of the disclosure.

Referring to FIG. 8, FIG. 8 illustrates a device 80 provided in embodiments of the disclosure. The device 80 includes a processor 801, a memory 802, and a communication interface 803, where the processor 801, the memory 802, and the communication interface 803 are coupled with each other via a bus 804.

The memory 802 includes but is not limited to a random access memory (RAM), a read-only memory (ROM), an erasable programmable read only memory (EPROM), or a compact disc read-only memory (CD-ROM). The memory 802 is configured to store related computer programs and data. The communication interface 803 is configured to receive and transmit data.

The processor 801 may be one or more central processing units (CPUs). If the processor 801 is one CPU, the CPU may be a single-core CPU or a multicore CPU.

The processor 801 in the device 80 is configured to read out computer program codes stored in the memory 802 to transmit a data packet to other UEs, where the data packet includes relay information.

Specifically, the communication unit 601 can transmit the data packet to the other UEs through broadcast or multicast. Transmission through broadcast or multicast can include transmission through a mobile communication network such as an LTE network or an NR network. In actual applications, transmission through broadcast or multicast can also include transmission through a short-distance network such as bluetooth, WiFi, radio frequency, or the like. Specific expressive forms of a bearer network for the above broadcast or multicast will not be limited in the disclosure.

Specifically, in an optional solution, the relay information can be used to support whether the other UEs serve as a relay UE of the UE 1.

Specifically, in another optional solution in a relay scenario, the relay information includes but is not limited to one of or any combination of: a source zone ID, a zone ID of the UE 1 of a previous hop, a distance parameter X, or a range, where the range is a maximum communication distance or a minimum communication distance required by services.

In another optional solution, the relay information may further include information of relay hop count, and the information of relay hop count may be a relay counter. Each time the data packet is relayed, a value of the relay counter is decreased by 1. An initial value of the relay counter can be configured by a network device (e.g., a base station or an AP), and can also be configured through control signaling, e.g., RRC signaling. The initial value of the relay counter can also be configured through other control signaling, where specific configuration manners and specific expressive forms of the above control signaling will not be limited in the disclosure.

In an optional solution in the disclosure, the relay information may be carried in an MAC header or SCI of the data packet. In another optional solution, the relay information may be carried in the MAC header and the SCI. In actual application, the relay information may also be carried in other positions in the data packet, e.g., customizing a field to coordinate the relay information.

It is to be noted that for implementations of each unit, reference can also made to corresponding illustration of the method embodiments as illustrated in FIG. 2, FIG. 4, and FIG. 5.

Figure 9:
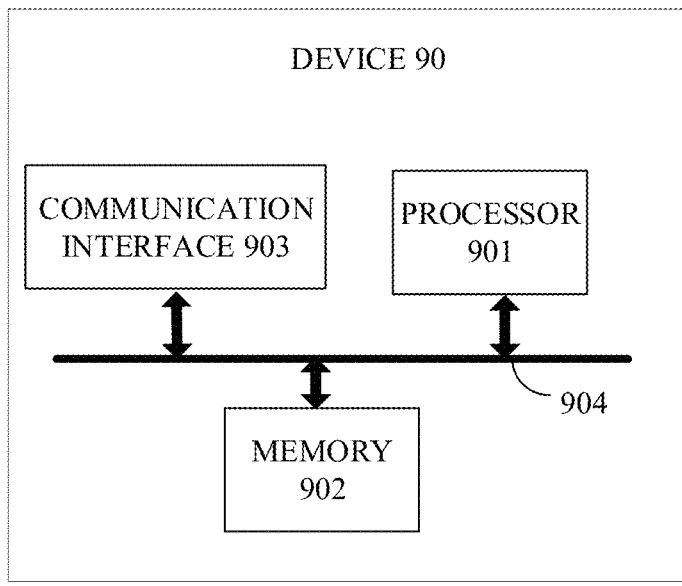
FIG. 9 is a schematic structural diagram illustrating a device provided in embodiments of the disclosure.

Referring to FIG. 9, FIG. 9 illustrates a device 90 provided in embodiments of the disclosure. The device 90 includes a processor 901, a memory 902, and a communication interface 903, where the processor 901, the memory 902, and the communication interface 903 are coupled with each other via a bus 904.

The memory 902 includes but is not limited to an RAM, an ROM, an EPROM, or a CD-ROM. The memory 902 is configured to store related computer programs and data. The communication interface 903 is configured to receive and transmit data.

The processor 901 may be one or more CPUs. If the processor 901 is one CPU, the CPU may be a single-core CPU or a multicore CPU.

The processor 901 in the device 90 is configured to read out computer program codes stored in the memory 902 to execute the following.

Receive a data packet transmitted by a UE 1, where the data packet includes relay information, and the relay information is used to support whether other UEs serve as a relay of the UE 1.

Specifically, in another optional solution in a relay scenario, the relay information includes but is not limited to one of: or any combination of a source zone ID, a zone ID of the UE 1 of a previous hop, a distance parameter X, or a range, where the range is a maximum communication distance or a minimum communication distance required by services.

In another optional solution, the relay information may further include information of relay hop count, and the information of relay hop count may be a relay counter. Each time the data packet is relayed, a value of the relay counter is decreased by 1. An initial value of the relay counter can be configured by a network device (e.g., a base station or an AP), and can also be configured through control signaling, e.g., RRC signaling. The initial value of the relay counter can also be configured through other control signaling, where specific configuration manners and specific expressive forms of the above control signaling will not be limited in the disclosure.

Parse the data packet to acquire the relay information, and determine whether to serve as a relay of the UE 1 according to the relay information.

Specifically, in an optional solution, acquire a distance Z between the UE 2 and a source UE according to the source zone ID, and acquire a distance Y between the UE of the previous hop and the UE 2 according to the zone ID of the UE of the previous hop. If Z<range and Y>X, the UE 2 determines to serve as the relay of the UE 1.

According to the technical solution, in actual applications, since Y is limited to be larger than X, a problem that the UE 2 is closer to UE 0 (the UE of the previous hop) is avoided, thereby avoiding increasing the relay hop count.

Specifically, in another optional solution, acquire a distance Z between the UE 2 and a source UE according to the source zone ID, and acquire a distance Y between the UE of the previous hop and the UE 2 according to the zone ID of the UE of the previous hop. If Z<range, Y>X, and relay counter≥0, the UE 2 determines to serve as the relay of the UE 1.

According to the technical solution, in actual applications, since Y is limited to be larger than X, a problem that the UE 2 is closer to the UE 0 (the UE of the previous hop) is avoided, thereby avoiding increment of the relay hop count and ensuring that a total number of relays is smaller than the relay hop count.

Optionally, after the UE 2 determines to serve as the relay of the UE 1, the communication unit forwards the data packet.

In the device illustrated in FIG. 9, the UE 2 acquires the relay information in the data packet received, such that the UE 2 can determine whether the UE 2 satisfies a relay condition of the UE 1 according to the relay information. If the UE 2 satisfies the relay condition of the UE 1, the UE 2 serves as the relay UE of the UE 1 and then forwards the data packet of the UE 1. Since the UE 2 performs conditional determination before the UE 2 forwards the data packet of the UE 1, the number of relay devices and the number of relay times are decreased, and thus increasing relay efficiency.

It is to be noted that for implementations of each unit, reference can also made to corresponding illustration of the method embodiments as illustrated in FIG. 3, FIG. 4, and FIG. 5.

A chip system is further provided in embodiments of the disclosure. The chip system includes at least one processor, at least one memory, and at least one interface circuit, where a transceiver and the at least one processor are coupled with each other via a line. The at least one memory is configured to store computer programs which are executed by the processor to implement the method procedures as illustrated in FIG. 2, FIG. 3, FIG. 4, and FIG. 5.

A computer-readable storage medium is further provided in embodiments of the disclosure. The computer-readable storage medium is configured to store computer programs which are executed on a network device to implement the method procedures as illustrated in FIG. 2, FIG. 3, FIG. 4, and FIG. 5.

A computer program product is further provided in embodiments of the disclosure. The computer program product is executed on a terminal to implement the method procedures as illustrated in FIG. 2, FIG. 3, FIG. 4, and FIG. 5.

A terminal is further provided in embodiments of the disclosure. The terminal includes a processor, a memory, a communication interface, and one or more programs, where the one or more programs are stored in the memory and configured to be performed by the processor, and the one or more programs include instructions used for performing the steps of the methods in the embodiments as illustrated in FIG. 2, FIG. 3, FIG. 4, and FIG. 5.

The foregoing solution of the embodiments of the disclosure is mainly introduced from the viewpoint of execution of the method side. It can be understood that, in order to implement the above functions, the electronic device includes hardware structures and/or software modules for performing the respective functions. Those skilled in the art should easily recognize that, in combination with the units and algorithmic operations of various examples illustrated in the embodiments provided herein, the disclosure can be implemented in hardware or a combination of the hardware and computer software. Whether a function is implemented by way of the hardware or hardware driven by the computer software depends on the particular application and design constraints of the technical solution. Those skilled in the art may use different methods to implement the illustrated functions for each particular application, but such embodiment should not be considered as beyond the scope of the disclosure.

According to the embodiments of the disclosure, division of functional units may be performed for the electronic device in accordance with the foregoing method examples. For example, each functional unit may be divided according to each function, and two or more functions may be integrated in one processing unit. The above-mentioned integrated unit can be implemented in the form of hardware or software program modules. It should be noted that the division of units in the embodiments of the disclosure is schematic, and is merely a logical function division, and there may be other division manners in actual embodiments.

A computer storage medium is further provided in embodiments of the disclosure. The computer storage medium is configured to store computer programs used for electronic data interchange, where the computer programs enable a computer to execute part of or all of any one of the methods illustrated in the above-mentioned method embodiments. The above computer includes an electronic device.

A computer program product is further provided in embodiments of the disclosure. The computer program product includes a non-transitory computer-readable storage medium that stores computer programs. The computer programs are operable with a computer to execute part of or all of the steps of any one of the methods illustrated in the above-mentioned method embodiments. The above computer includes an electronic device.

It is to be noted that for the sake of simplicity, the foregoing method embodiments are described as a series of action combinations. However, it will be appreciated by those skilled in the art that the disclosure is not limited by the sequence of actions described. According to the disclosure, some steps may be performed in other orders or simultaneously. Besides, it will be appreciated by those skilled in the art that the embodiments described in the specification are preferred embodiments, and the actions and modules involved are not necessarily essential to the disclosure.

In the foregoing embodiments, the description of each embodiment has its own emphasis. For the parts not described in detail in one embodiment, reference may be made to related descriptions in other embodiments.

In several embodiments provided in the disclosure, it will be appreciated that the apparatuses disclosed may also be implemented in various other manners. For example, the above apparatus embodiments are merely illustrative, e.g., the division of units is only a division of logical functions, and there may exist other manners of division in practice, e.g., multiple units or assemblies may be combined or may be integrated into another system, or some features may be ignored or skipped. In other respects, the coupling or direct coupling or communication connection as illustrated or discussed may be an indirect coupling or communication connection through some interfaces, apparatuses, or units, and may be electrical, or otherwise.

Units illustrated as separated parts may or may not be physically separated. Components or parts displayed as units may or may not be physical units, and may reside at one location or may be distributed to multiple network units. Part of or all of the units may be selectively adopted according to practical needs to achieve desired objectives of the solutions of embodiments.

In addition, various functional units described in various embodiments of the disclosure may be integrated into one processing unit or may be presented as a number of physically separated units, and two or more units may be integrated into one unit. The integrated unit may be implemented by a form of hardware or a software functional unit.

If the integrated units are implemented as software functional units and sold or used as standalone products, they may be stored in a computer readable memory. According to such an understanding, the essential technical solution, or the portion that contributes to the related art, or all or part of the technical solution of the disclosure may be expressed as software products. The computer software products can be stored in a memory and may include multiple instructions that, when executed, can cause a computing device (e.g., a personal computer, a server, a network device, etc.) to execute all or part of steps of the methods described in various embodiments of the disclosure. The above memory may include various kinds of media that can store program codes, such as a universal serial bus (USB) flash disk, an ROM, an RAM, a mobile hard disc, a magnetic disk, or an optical disk.

It will be understood by those of ordinary skill in the art that all or part of the steps of the various methods in the embodiments described above may be accomplished by means of a program to instruct associated hardware, and the program may be stored in a computer-readable memory, which may include a flash disk, an ROM, an RAM, a magnetic disk, or an optical disk.

The above embodiments in the disclosure are introduced in detail. Principles and embodiment manners of the disclosure are elaborated with specific embodiments herein. The illustration of embodiments above is only used to help understanding of methods and core ideas of the disclosure. At the same time, for those of ordinary skill in the art, according to ideas of the disclosure, there will be changes in the specific embodiment manners and application scope. In summary, contents of this specification should not be understood as limitation on the disclosure.

What is claimed is:

1. A method for relay communication for a user equipment (UE), comprising:
   transmitting, by a UE 1, a data packet to other UEs, wherein the data packet comprises relay information, wherein according to the relay information, the other UEs are able to serve as a relay UE of the UE 1, or the other UEs are unable to serve as the relay UE of the UE 1, and wherein the relay information comprises a source zone identifier (ID), a zone ID of the UE 1, a distance parameter X, and a range, the range is a maximum communication distance or a minimum communication distance required by services, and the distance parameter X is a distance threshold between the UE 1 and the other UEs; and
   wherein according to the relay information, the other UEs being able to serve as the relay UE of the UE 1, comprise that: a distance Z between the other UEs and a source UE is acquired according to the source zone ID, a distance Y between the UE 1 and the other UEs is acquired according to the zone ID of the UE1, and the other UEs determine to serve as the relay UE of the UE 1, if Z<the range and Y>X.

2. The method of claim 1, wherein the relay information further comprises information of relay hop count.

3. The method of claim 1, wherein transmitting, by the UE 1, the data packet to the other UEs specifically comprises:
   transmitting, by the UE 1, the data packet through multicast or broadcast.

4. The method of claim 1, wherein
   the relay information is carried in a medium access control (MAC) header and/or sidelink control information (SCI) of the data packet.

5. A method for relay communication for a user equipment (UE), comprising:
   receiving, by a UE 2, a data packet transmitted by a UE 1, wherein the data packet comprises relay information, wherein according to the relay information, other UEs are able to serve as a relay UE of the UE 1, or the other UEs are unable to serve as the relay UE of the UE 1, wherein the relay information comprises a source zone identifier (ID), a zone ID of the UE 1, a distance parameter X, and a range, the range is a maximum communication distance or a minimum communication distance required by services, and the distance parameter X is a distance threshold between the UE 1 and the other UEs;
   parsing, by the UE 2, the data packet to acquire the relay information; and
   determining, by the UE 2, to serve as a relay of the UE 1 according to the relay information, or determining, by the UE 2, not to serve as the relay of the UE 1 according to the relay information;
   wherein said determining to serve as the relay of the UE 1 according to the relay information comprises:
   acquiring a distance Z between the UE 2 and a source UE according to the source zone ID, and acquiring a distance Y between the UE 1 and the UE 2 according to the zone ID of the UE1; and
   determining, by the UE 2, to serve as the relay of the UE 1, if Z<the range and Y>X.

6. The method of claim 5, wherein the relay information further comprises information of relay hop count, and the information of relay hop count is a relay counter.

7. The method of claim 6, wherein determining to serve as the relay of the UE 1 according to the relay information comprises:
   acquiring a distance Z between the UE 2 and a source UE according to the source zone ID, and acquiring a distance Y between the UE of the previous hop and the UE 2 according to the zone ID of the UE1; and
   determining, by the UE 2, to serve as the relay of the UE 1, if Z<the range, Y>X, and the relay counter≥0.

8. The method of claim 5, further comprising:
   after the UE 2 determines to serve as the relay of the UE 1, forwarding, by the UE 2, the data packet.

9. A user equipment (UE) 1, comprising:
   a communication interface;
   a processor; and
   a memory storing a computer program which, when executed by the processor, causes the communication interface to:
   transmit a data packet to other UEs, wherein the data packet comprises relay information, wherein according to the relay information, the other UEs are able to serve as a relay UE of the UE 1, or the other UEs are unable to serve as the relay UE of the UE 1, wherein the relay information comprises a source zone identifier (ID), a zone ID of the UE 1, a distance parameter X, and a range, the range is a maximum communication distance or a minimum communication distance required by services, and the distance parameter X is a distance threshold between the UE 1 and the other UEs;

wherein according to the relay information, the other UEs being able to serve as the relay UE of the UE 1, comprise that: a distance Z between the other UEs and a source UE is acquired according to the source zone ID, a distance Y between the UE 1 and the other UEs is acquired according to the zone ID of the UE1, and the other UEs determine to serve as the relay UE of the UE 1, if Z<range and Y>X.

10. The UE 1 of claim 9, wherein the relay information further comprises information of relay hop count.

11. The UE 1 of claim 9, wherein the computer program executed by the processor to cause the communication interface to transmit the data packet to the other UEs is executed by the processor to cause the communication interface to:

transmit the data packet through multicast or broadcast.

12. The UE 1 of claim 9, wherein the relay information is carried in a medium access control (MAC) header and/or sidelink control information (SCI) of the data packet.

* * * * *